UNITED STATES PATENT OFFICE.

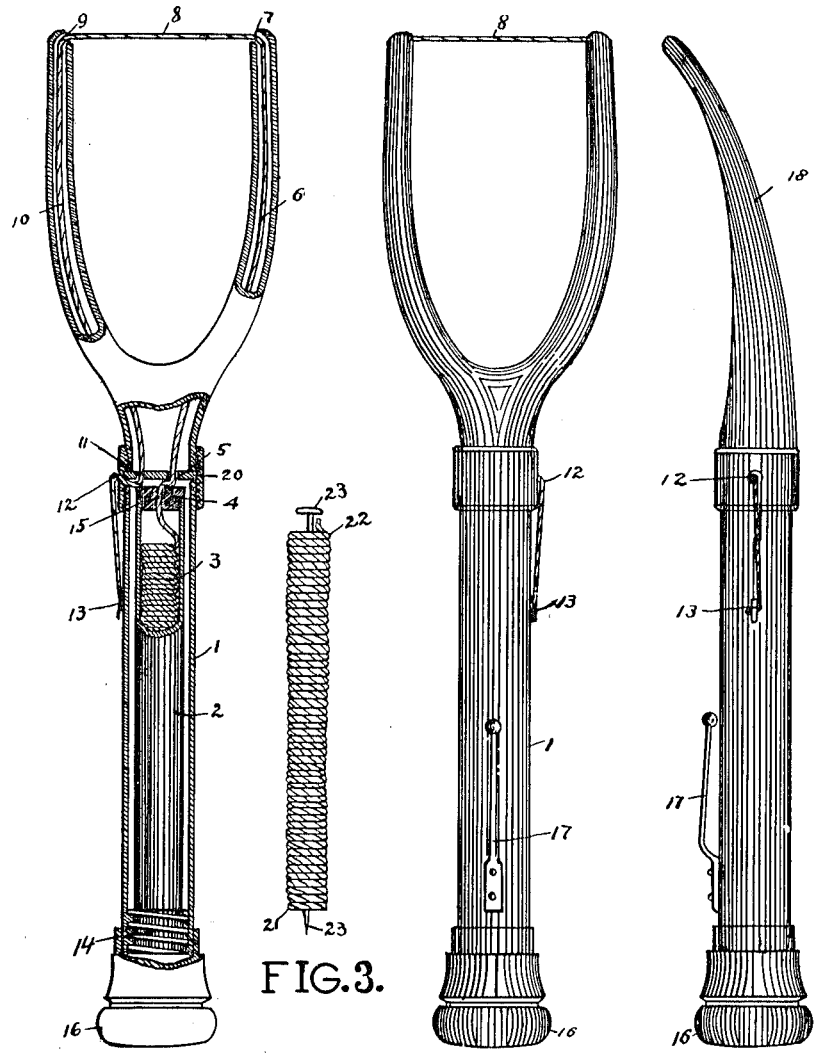

NICHOLAS A. KRISTMANN, OF MENLO PARK, CALIFORNIA.

DENTAL-FLOSS CASE.

1,274,423.　　　　Specification of Letters Patent.　　Patented Aug. 6, 1918.

Application filed February 21, 1918. Serial No. 218,471.

*To all whom it may concern:*

Be it known that I, NICHOLAS A. KRISTMANN, a subject of the Kingdom of Hungary, having declared my intention to become a citizen of the United States, having received my first papers in that connection, and a resident of the town of Menlo Park, in the county of San Mateo, State of California, have made a new and useful invention—to-wit, Improvement in Dental-Floss Cases with Tubular Two-Pronged Fork Attachments; and I do hereby declare the following to be a full, clear, concise, and exact description of the same.

My invention relates to means for cleaning the teeth of human beings with the object of using tooth floss in a manner to reach around each tooth with the greatest possible efficiency, by means of a forked instrument which is provided with a supply of tooth floss and the exposed part between the two prongs is used to clean the teeth of waste matter, and after each use, the used up floss may be removed for reason of proper sanitation.

In this specification and the annexed drawings, the invention is illustrated in the form considered to be the best, but it is to be understood that the invention is not limited to such a form, because it may be embodied in other forms, and it is also to be understood that in and by the claims following the description, it is desired to cover the invention in whatever form it may be embodied.

In the accompanying sheet of drawings,

Figure 1 is a diagrammatic side view of the dental floss case and forked attachment.

Fig. 2 is a top view of dental floss case with two-pronged fork and showing the inflexibly stretched floss between the two prongs.

Fig. 3 is a fragmentary detail of the dental floss spool fitting into dental floss supply tube.

Fig. 4 is a partial cross-section of dental case and fork and supply tube.

In detail the construction illustrated in the drawings includes a case 1, with 2 (two) prongs on one end, and into which a tube 2 is inserted in the other end, containing a spool of dental floss 3, whose one end is taken through opening 15 in cap 4; thence parallel with partition 20, through opening 5, and along channel 6 through opening 7, where it is exposed at 8 and at which place it is used in cleaning the teeth; thence it is taken through opening 9 through channel 10 through opening 11; thence along the partition wall 20 and through opening 12; from there to the cutting knife 13, where the waste part is cut off and thrown away.

This invention operates substantially as follows: Before cleaning the teeth, loosen up cap 4 by unscrewing knob 16, at screw 14, and pull on the floss at opening 12 till an exchange is made from opening 7 to 9 of a supply of clean floss; then screw cap 4 tightly to partition wall 20 and press floss firmly to partition wall 20 by screwing knob 16 at screw 14, so as to insure an inflexible exposure at 8, opening between prongs 7 and 9, which exposed part then is ready for use. This operation may be repeated before each use.

I provide tube 2 at cap 4 with a hard rubber tip, so as to prevent the floss from sliding along partition wall 20 while in use when pressed firmly against partition wall 20.

To refill the tube 2 with a fresh spool of floss 3, unscrew case 1 at the partition wall 20 from fork and then screw out tube 2 from case 1 at screw 14, take off cap 4 and put a new spool of floss 3 into tube 2; remove pin 23 and replace cap 4, and put tube 2 into case 1; take end of floss and put through cap 4 at opening 15; then through opening 5 along channel 6 through opening 7, exposed at 8, run through 9 along channel 10, out again through opening 11 at opening 12; then screw case 1 to wall 20; fasten cap 4 to wall 20, and the instrument is ready for service.

To insure the proper paying out of the dental floss I begin to wind the floss around a pin 23 and start at the end 21 and wind up the full thickness of the spool as I go along till I reach the end 22, and when the spool is placed in the tube 2, I pull out the pin 23, thereby insuring a uniform discharge of dental floss.

The two prongs of the fork 18 are slightly curved to facilitate more efficient usage.

I also provide for pocket use a safety clip 17.

Having thus described this invention, what I claim and desire to secure by Letters Patent is,—

1. A dental floss holder comprising a case, a partition wall arranged at one end of the case having apertures therethrough for the passage of dental floss, a tubular two pronged fork through which the floss passes attached to the same end of the case, a dental floss containing tube arranged in said case and means for pressing the end of the tube against said partition wall, whereby the floss is clamped in position.

2. A dental floss holder comprising a case, a partition wall arranged at one end of the case and provided with an aperture through which the floss passes, a tubular two pronged fork through which the floss passes attached to the same end of the case, a dental floss containing tube in said case, a plug having an aperture therein closing the end of the tube adjacent said partition wall, the apertures in the wall and plug being displaced laterally from each other and means for pressing the plug against said wall.

3. A dental floss holder comprising a case, a holder for dental floss including arms in spaced relation attached to said case, a partition wall in said case having an aperture therein through which the floss passes, a dental floss containing tube in said case, a plug in the end of said tube having an aperture therein through which the floss passes before it passes through the aperture in the partition wall and means for pressing the plug against the partition wall to clamp the dental floss.

4. A dental floss holder comprising a case, a partition wall in said case having apertures therein through which the dental floss passes, a tubular two pronged fork attached to said case and through which the floss passes, a floss containing tube in said case, a plug in the end of said tube having an aperture therein offset with respect to the aperture in the partition wall through which the outgoing floss passes, and underlying the second aperture through which the used floss passes and a knob secured to the end of said tube in screw threaded engagement with said case whereby rotation of the knob moves the tube longitudinally in the case.

5. A dental floss holder comprising a two pronged fork across which dental floss is inflexibly stretched, a case attached to said fork, a floss supply tube in said case from which floss passes to the gap across the fork and means for moving said tube to clamp said floss in inflexible condition across said fork.

NICHOLAS A. KRISTMANN.